(No Model.)
F. CELCE.
BOLT.
No. 380,184. Patented Mar. 27, 1888.
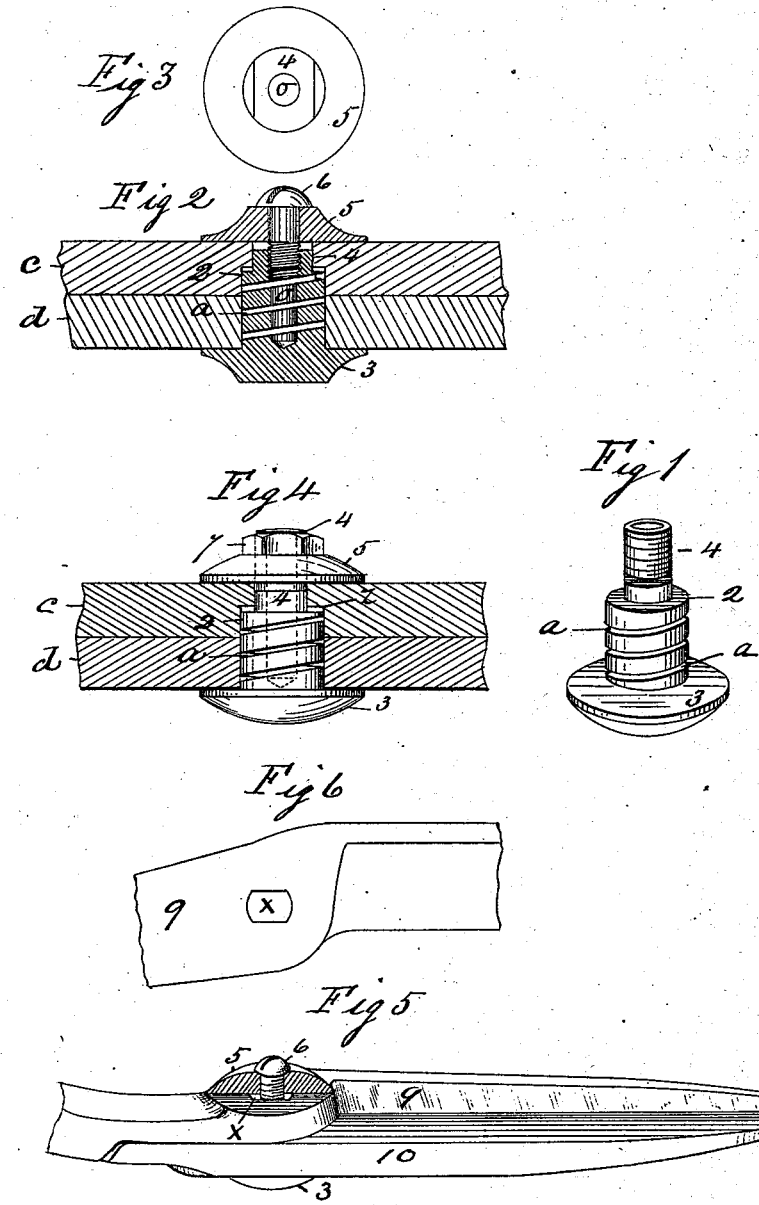
Witnesses
G. M. Chamberlain
Wm. F. Bellows
Inventor,
Frederick Celce
By his Attorneys
Chapin

UNITED STATES PATENT OFFICE.

FREDERICK CELCE, OF HOLYOKE, MASSACHUSETTS.

BOLT.

SPECIFICATION forming part of Letters Patent No. 380,184, dated March 27, 1888.

Application filed December 5, 1887. Serial No. 256,974. (No model.)

*To all whom it may concern:*

Be it known that I, FREDERICK CELCE, a citizen of the United States, residing at Holyoke, in the county of Hampden and State of Massachusetts, have invented new and useful Improvements in Longitudinally-Elastic Bolts, of which the following is a specification.

This invention relates to joint or pivot bolts for various mechanical structures, as hereinafter set forth, the object being to provide an improved bolt for uniting the blades of shears or other objects having similar vibrating members or action to which it is desirable to impart a certain degree of elastic frictional resistance at their point of pivotal connection; and the invention consists in the peculiar construction of said bolt, all as hereinafter fully described, and pointed out in the claim.

In the drawings forming part of this specification, Figure 1 is a perspective view of a joint or pivot bolt constructed according to my invention. Fig. 2 is a longitudinal section of portions of two bars having applied thereto a pivot-bolt embodying my improvements, said bolt and a washer attached thereto being shown in section and the washer attaching screw in side elevation. Fig. 3 is a plan view of the washer shown in Fig. 2 and of the end of said bolt. Fig. 4 represents, also, a longitudinal section of portions of two united bars, but showing said pivot-bolt in side elevation and provided with a nut on its neck instead of a screw entering the end thereof. Fig. 5 is a perspective view of the blades of a pair of shears (the handles being shown broken off) united by said bolt, the washer being shown in section. Fig. 6 is a section of one of the shear-blades shown in Fig. 5.

The essential object of this invention is to provide a joint or pivot bolt which of itself is capable of longitudinal elongation and retraction, whereby the use of a spring or springs, in connection with a joint or pivot bolt as a separate element whereby the parts united by said bolt are so yieldingly connected that the adjoining surfaces thereof have a certain degree of frictional resistance imparted thereto, is obviated.

Fig. 1 illustrates said improved joint and pivot bolt in perspective view, of which 2 is the body thereof, and 3 a head fixed on one end of said body either integral therewith or otherwise. Said bolt, as shown in Fig. 1, is constructed to receive a nut, 7, (see Fig. 4,) on its shank 4, whereby the bolt is connected to the blades or shears or other vibrating bars or joint parts. Figs. 2 and 5 illustrate constructions of said bolts in which a screw, 6, having one end screwing into the end of said bolt, provides a substitute for the nut 7, said screw being preferable to said nut in joint constructions requiring only a limited compression of the united parts. The body 2 of said bolt is perforated longitudinally, forming a chamber, o, therein, whereby said body is made tubular, and said shank 4 is screw-threaded outwardly when the nut 7 is used and internally when the screw 6 is employed. The above-described qualities of longitudinal elongation and retraction are imparted to said bolt-body 2 by forming therein the spiral groove a, which is cut through the walls of said body, thereby forming between the head 3 and the opposite end of the body 2 substantially a volute spring. In applying said bolt as a uniting pivot for the bars c and d, Figs. 2 and 4, and also for uniting the blades 9 and 10 of shears, it is preferable to form the shank 4 of said bolt with flattened sides, as shown in Fig. 3, and to provide in one of said bars or blades a perforation, as x, Fig. 6, having two parallel sides, to receive the said end of the bolt-shank, so that when the shear-blades or said bars are given a vibratory motion the washer 5, which is interposed between the head of the screw 6 or between the nut 7 and the side of the bar c or the shear-blade 9, will have such reciprocating rotary motion as may be imparted to the bolt, thereby obviating any danger that said screw or nut may be loosened by the operation of said bars or blades. In fitting said bolt to act as a pivot-connection between two bars or blades the perforations in the latter, which receive the body of the bolt, are made of slightly greater length than said body, as at z, Fig. 4, in order to allow for the elongation of said body when the nut 7 or the screw 6 are either one of them operated to draw said bars or blades into closer contact with each other, the said volute spring, constructed as described, in the body of the bolt itself by its ension serving to effect such degree of frictional contact of said bars as may be desired without the employment of any other spring than that above mentioned.

The within-described bolt, comprising within itself the qualities of longitudinal elongation and retraction, is made, preferably, of steel and suitably tempered, and is applicable to a variety of uses other than those above specified—as, for instance, as a bolt for uniting thill-couplings, whereby the latter are by the spring of the bolt prevented from rattling, as a bolt to be used for similar purposes on various parts of carriage-work and for connecting the ends of elliptic and other springs, and for use on machinery where it is desirable that a bolt uniting certain parts thereof shall be prevented from working loose by the movements of the united parts. Said bolt is also used to advantage for uniting the fish-joints of railway-rails, for its longitudinal tension prevents the nut thereon from working loose.

What I claim as my invention is—

A bolt having a tubular body and a spiral groove through the walls thereof, whereby a volute spring is formed between the head and the opposite end of said bolt, substantially as set forth.

FREDERICK CELCE.

Witnesses:
G. M. CHAMBERLAIN,
H. A. CHAPIN.